United States Patent [19]

Carter

[11] 4,367,058
[45] Jan. 4, 1983

[54] BEVOLUTE GEAR SYSTEM

[75] Inventor: Willis M. Carter, Lexington, Ky.

[73] Assignee: The University of Kentucky Research Foundation, Lexington, Ky.

[21] Appl. No.: 156,107

[22] Filed: Jun. 3, 1980

Related U.S. Application Data

[62] Division of Ser. No. 880,368, Feb. 23, 1978, Pat. No. 4,238,970.

[51] Int. Cl.$^3$ ............................................... B23F 9/14
[52] U.S. Cl. ........................................ 409/26; 409/39; 409/51
[58] Field of Search ...................... 409/26, 30, 39, 51, 409/54, 55, 53, 12; 76/101 A

[56] References Cited

U.S. PATENT DOCUMENTS

| | | | |
|---|---|---|---|
| 1,355,919 | 10/1920 | Schurr | 409/26 |
| 1,372,725 | 3/1921 | Sloan | 409/53 |
| 2,362,364 | 11/1944 | Dusevoir | 409/131 |
| 3,915,060 | 10/1975 | Koga | 409/53 |
| 4,211,511 | 7/1980 | Kotthaus | 409/26 |

Primary Examiner—Z. R. Bilinsky
Attorney, Agent, or Firm—Birch, Stewart, Kolasch & Birch

[57] ABSTRACT

The present invention relates to a bevolute gearing system which transmits torque between non-intersecting shafts at right angles to each other. The bevolute gear system includes a pinion gear which is flat and in one plane. The pinion gear is designed to include teeth which are shaped in the form of an involute spiral. The bevolute gear system includes a second gear which is also designed to include teeth which are shaped in the form of an involute spiral. The second gear is mounted on a non-intersecting axis at a right angle to the axis of the pinion gear. The bevolute gearing system of the present invention reduces the thrust loads to negligible values for the bearings of both the pinion gear and the second gear. In addition,. higher mechanical efficiencies, wider tolerances on alignment of the gears, interchangeability between the gear and the pinions to produce different ratios and a substantially eliminated gear noise are a few of the many advantages disclosed in the present invention.

6 Claims, 8 Drawing Figures

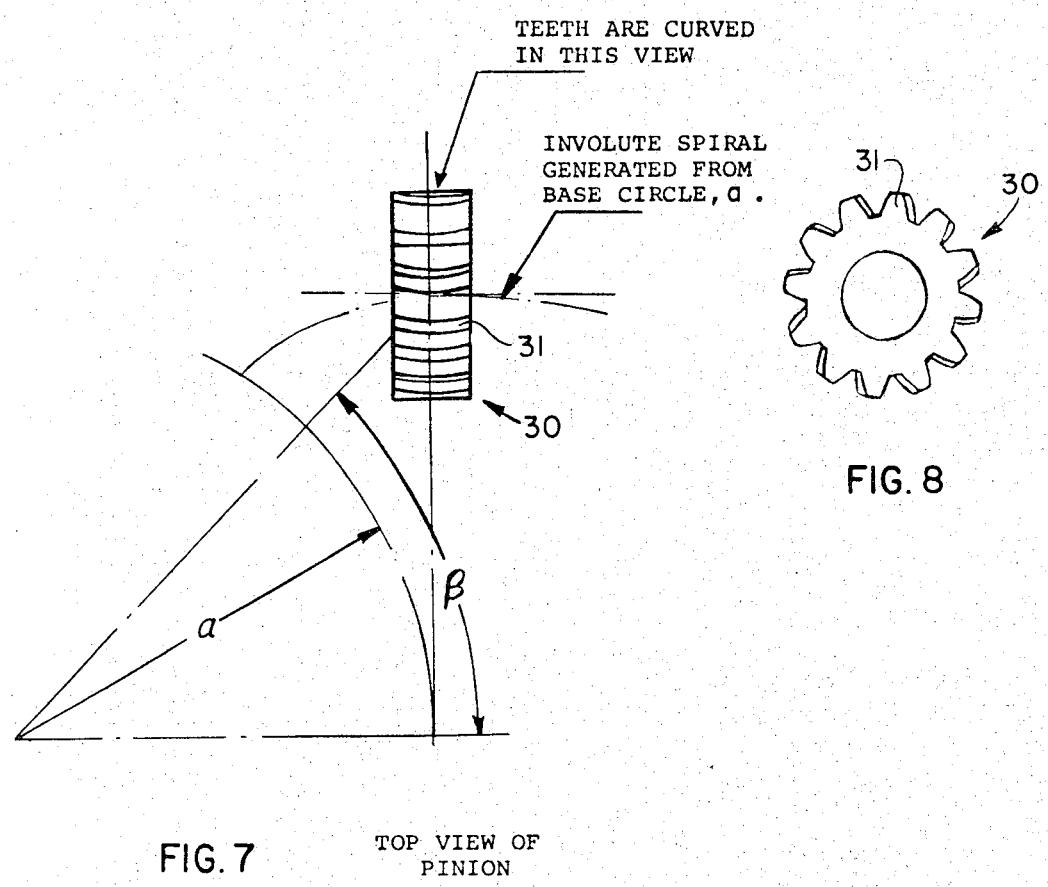

BEVOLUTE GEAR SYSTEM

This application is a divisional of copending application Ser. No. 880,368, filed on Feb. 23, 1978, now U.S. Pat. No. 4,238,970.

BACKGROUND OF THE INVENTION

1. Field of the Invention

The present invention is directed to a bevolute gearing system which transmits torque between non-intersecting shafts at right angles to each other.

2. Prior Art

It is often desirable to transmit torque between non-intersecting shafts. It is customary to transmit the torque by using at least one gear which is beveled or tapered to accommodate the grooves in the second gear. The Trbojevich patent, U.S. Pat. No. Re. 16,371 discloses a conventional gearing system. The gearing system includes a spiral beveled gear which mates with a worm gear. Although the Trbojevich patent discloses the use of teeth which are shaped in the form of an "modified" involute of a circle, it does not disclose a bevolute gear system as set forth in the present invention.

Another conventional gear system is disclosed by the Williams patent, U.S. Pat. No. 1,469,290. The Williams patent discloses a beveled "pinion" which is designed to mesh with a "wheel." The Williams patent does not disclose a bevolute gear system including a pinion gear which is flat and in one plane. Further, the Williams patent does not disclose a second gear which is designed to include teeth which are shaped in the form of an involute spiral.

The Chou patent, U.S. Pat. No. 2,749,764, discloses a variable speed drive mechanism. A rotatable platform 24 is mounted within the housing 10 and is adapted to be engaged by the disc or wheel 17. By moving the wheel 17 radially inwardly or outwardly in the housing extension 14, the speed of the turntable 34 is varied. It is important to note, that torque may be transmitted between the two elements disclosed in the Chou patent by means of a gear system or by employing magnetic forces. The bevolute gear system of the present invention clearly distinguishes over the disclosure of the Chou patent by employing first and second gears which include teeth which are shaped in the form of an involute spiral.

SUMMARY OF THE INVENTION

It is an object of the present invention to provide a bevolute gearing system which reduces the thrust loads to negligible values on the bearings of both the pinion and the gear wheel.

Another object of the present invention is to provide higher mechanical efficiencies at the same offset.

A further object of the present invention is to provide wider tolerances on the alignment of the pinion gear and the wheel gear.

A still further object of the present invention is to provide a bevolute gearing system with interchangeability between the wheel gear and the pinions to produce different ratios using the same wheel gear.

A still further object of the present invention is to simplify the manufacture of the gearing system by using a basic generation process for both the wheel gear and the pinion.

Another object of the present invention is to provide a bevolute gearing system which eliminates gear noise by the form of the gear teeth.

A still further object of the present invention is to provide a bevolute gearing system which is completely non-self-locking, the gearing system may be driven in either direction.

These and further objects of the present invention are fulfilled by constructing a bevolute gearing system including a pinion gear which is non-beveled. The pinion gear is designed to include teeth which ware shaped in the form of an involute spiral. The bevolute gear system includes a second gear which is also designed to include teeth which are shaped in the form of an involute spiral and flat and in one plane. The second gear is mounted on a non-intersecting axis at a right angle to the axis of the pinion gear.

Further scope of applicability of the present invention will become apparent from the detailed description given hereinafter; it should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a top view of the pinion gear according to the present invention; and

FIG. 8 is a cross-sectional view of the pinion gear according to the present invention.

DETAILED DESCRIPTION OF THE PREFERRED EMBODIMENT

The tooth spirals of the present invention are of an involute form. An involute is a curve traced by the end of a line unwound from a circle. The present invention also utilizes the term "bevolute gearing" which indicates a combination of bevel action with an involute contour tooth form. The term "bevolute angle" refers to the angle at the center of the wheel gear which is defined as the angle between a line drawn from the center of the wheel gear and the pitch point of the pinion gear and a line drawn from the center of the wheel gear normal to the tangent drawn from the pitch point of the pinion gear to the base circle. The bevolute angle is fixed in accordance with the required pinion offset. The normal pitch of the teeth utilized in the bevolute gear system is constant for all positions across the facewidth of the gear and is dependent on the diametral pitch of the cutter and the bevolute angle.

Figure 1:
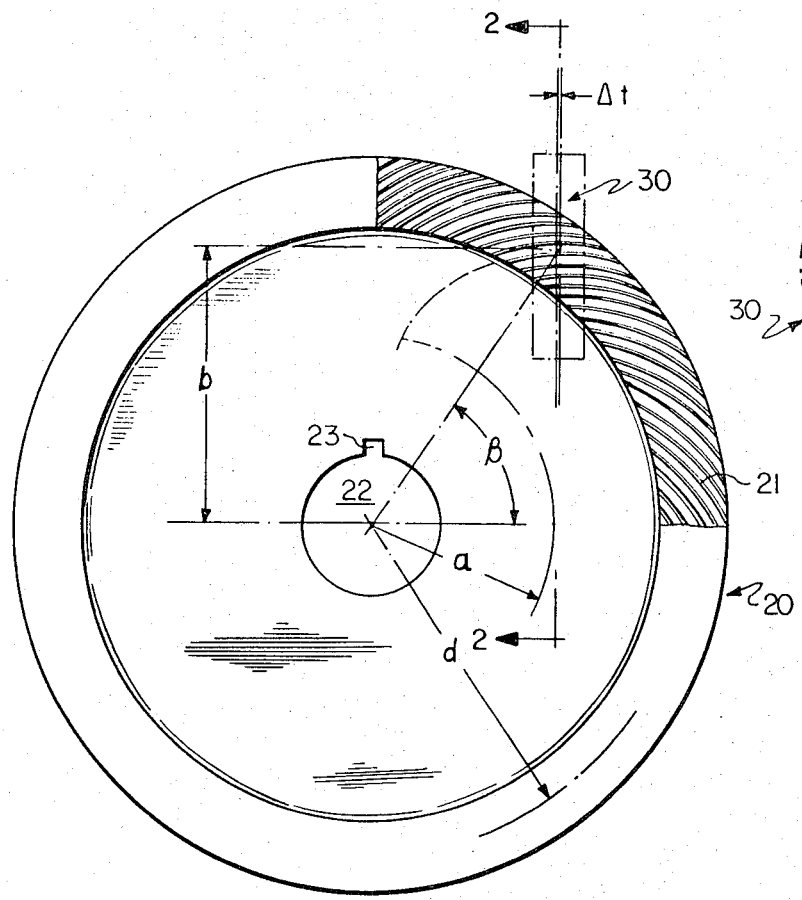
FIG. 1 illustrates the bevolute gearing system of the present invention including teeth which are shaped in the form of an involute spiral which are positioned around the entire wheel gear but are shown over only a portion thereof.

Referring in detail to FIGS. 1 to 3, 7 and 8 a bevolute gearing system is illustrated which includes a wheel gear 20 and a pinion gear 30. The pinion gear 30, as illustrated in FIGS. 7 and 8, is flat in one plane and includes teeth 31 which are shaped in the form of an involute spiral. The centerline of the offset pinion 30 is tangential to the base circle of the wheel gear 20. The base circle of the wheel gear 20 is shown to have a radius "a." In addition, the pinion gear 30 is offset a distance "b" from the axis of the wheel gear 20. As shown in FIG. 1, the relative positioning of the pinion gear 30 and the wheel gear 20 forms a bevolute angle $\beta$.

The wheel gear 20 illustrates a plurality of teeth shaped in the form of an involute spiral. The teeth are machined around the entire circumference of the wheel gear 20. Referring to FIG. 1, the involute spiral is formed by a curve traced on a plane by a point in a straight line that rolls without slip on the base circle "a."

Figure 2:
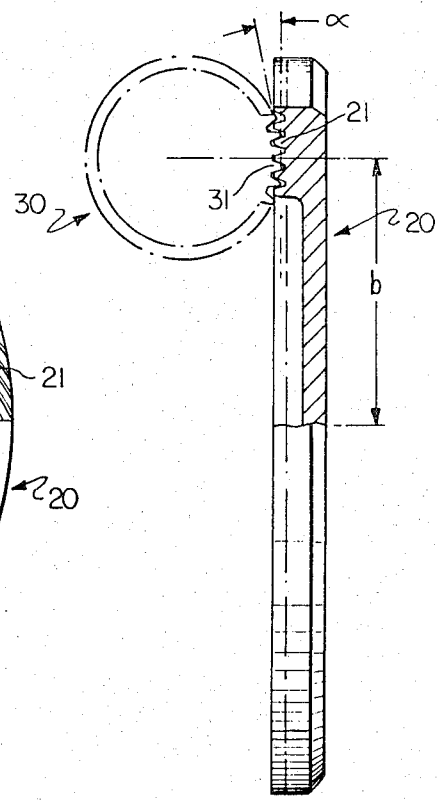
FIG. 2 is a partial cross-sectional view of the bevolute gearing system of the present invention taken along line 2—2 of FIG. 1.
Figure 3:
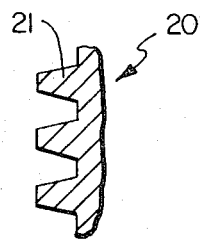
FIG. 3 illustrates the involute rack profile of the wheel gear.

If the pinion gear 30 is thin and of a width $\Delta t$ and is an involute gear with a pressure angle of $\alpha$, and assuming that the pinion gear 30 is positioned on an axis at a right angle to the axis of the wheel gear 20 but is offset by the distances "a" and "b," then the wheel gear has teeth which mesh with the pinion gear such that a cross section taken along line 2—2 through the wheel gear at a right angle to the axis of the very thin $\Delta t$ pinion gear results in a rack shape for the wheel gear teeth. This involute rack profile of the teeth 21 on the wheel gear 20 is shown in FIGS. 2 and 3.

If the contours of the teeth 21 on the wheel gear 20 are involutes generated about the radius "a" as a base circle, then the rotation of the pinion gear 30 will cause the wheel gear 20 to rotate about its axis and true angular velocity will be transmitted between the pinion gear and the wheel gear.

The pinion gear 30 does not have to be thin as assumed above to obtain the proper meshing requirements. The pinion gear may be of a finite thickness. The cutter utilized to manufacture the pinion gear will automatically cut the pinion teeth with a proper clearance for meshing with the wheel gear.

A pure rolling motion occurs on the pitch circles of the mating tooth profiles of the wheel gear and the pinion gear. On either side of the pitch point a sliding action occurs along the tooth surfaces. Because the tooth spirals are shaped in the form of an involute spiral, a quiet and smooth gear action is produced. As a result of this smooth gear action, the lubrication conditions could equal or surpass those in a hypoid system. Furthermore, the offset "b" in a bevolute gearing system can range from 50 to 75% of the pitch-circle radius "d" of the wheel gear 20, which is equivalent or better than a conventional hypoid gearing system.

The present invention discloses a bevolute gearing system which possesses interchangeability in the sense that different gearing ratios may be obtained by using different bevolute pinions with a single wheel gear with the bevolute angle being constant for all combinations.

As shown in FIGS. 1 and 2, the wheel gear 20 includes a central opening 22 with a notch 23 designed to prevent relative slipping between the wheel gear and an axle. The pinion gear 30, as illustrated in FIGS. 2, 7 and 8, includes teeth 31 which are shaped in the form of an involute spiral.

The efficiency of any gear system is determined by the power loss due to sliding friction between the two surfaces and due to oil churning. In the bevolute gearing system of the present invention, the power loss is considered to be mainly due to the sliding action between the teeth.

The standard tooth action between meshing gears is considered to be the conjugate action between a basic rack gear and a spur pinion gear. In the bevolute gearing system of the present invention, this standard tooth action occurs only along the normal plane through the pitch point. In the conventional worm gearing system there is an increasing deviation from the pitch point in either direction along the width of the pinion. However, this deviation is inherently accounted for in the generation process of the bevolute gearing system and does not require an unusual cutting tool.

It is important to analyze the nonstandard tooth action in a conventional gearing system to appropriately select the width of the bevolute pinion for a given base-circle radius and a given bevolute angle. By thoroughly understanding the tooth action a certain width of the pinion gear may be chosen in terms of a fraction of the base-circle radius of the wheel gear so as to limit the involute-deviation to a certain value.

The inside radius or cutoff radius and the outside radius of the wheel gear 20 depends upon the bevolute angle, diametral pitch, pinion gear width, the number of teeth in the pinion gear and the gearing ratio. The bevolute angle $\beta$ and the number of teeth in the pinion gear should be choosen so as to have a face contact ratio of at least 2.00.

Referring to FIGS. 1 and 2 the relationship between the pinion gear and the wheel gear is mathematically defined as follows:

a = Gear base-circle radius;
b = Offset of pinion;
c = Pinion pitch radius;
d = Gear pitch radius;
$\alpha$ = Gear pressure angle;
$\beta$ = Bevolute angle = gear helix angle;
N = No. of teeth in gear;
n = No. of teeth in pinion;
Pd = Diametral pitch;
Pc = Circular pitch;
R = Gear ratio;
a = d cos $\beta$;
b = d sin $\beta$;
(a/b) = cot $\beta$;
Pc = ($2\pi a/N$) = ($2\pi c/n$) = ($\pi$/Pd);
a = (N/n)c = Rc = (N/2Pd);
b = (N/n) (C/cot $\beta$) = (Rc/cot $\beta$) = (N/2Pd cot $\beta$);
C = (N/2Pd) = (n/2)(Pc/$\pi$);
d = (Nc/n cos $\beta$) = (Rc/cos $\beta$) = (N/2Pd cos $\beta$).

DETAILED DESCRIPTION OF MANUFACTURING A BEVOLUTE GEAR

To manufacture a bevolute gear it is necessary to machine bevolute teeth which are shaped in the form of an involute tooth profile. As previously discussed, an involute curve is produced by a straight line rolling without slip around a base-circle. Therefore, the converse of this principle is utilized in the generation of a bevolute tooth profile.

A conventional gear-shaping cutter is normally mounted on a rotating cutting arbor and the gear-blank is mounted on a rotating 90°, non-intersecting shaft. The rotating gear-blank is fed against the rotating cutter by moving the axes relative to each other as the shafts rotate at a certain prescribed rate. Further, the rotation of the gear-blank and cutter is geared to this movement. This conventional gear-shaping cutter will cut bevolute teeth to the full depth across the whole face of the gear-blank. Thus, the machining of the wheel gear is easily accomplished by placing a gear cutter on the axis of the pinion and rotating the wheel gear-blank against the gear cutter. This process will produce rack-shaped teeth with an involute spiral on the wheel gear.

Further, the machining of the pinion gear is easily accomplished by a rack cutter which has the same axis as the pinion gear and by mounting the pinion gear-blank on the axis of the pinion gear. As the rack cutter and the pinion gear rotate together, the cutter will generate teeth on the pinion gear-blank that will mesh with the wheel gear previously cut.

Figure 4:
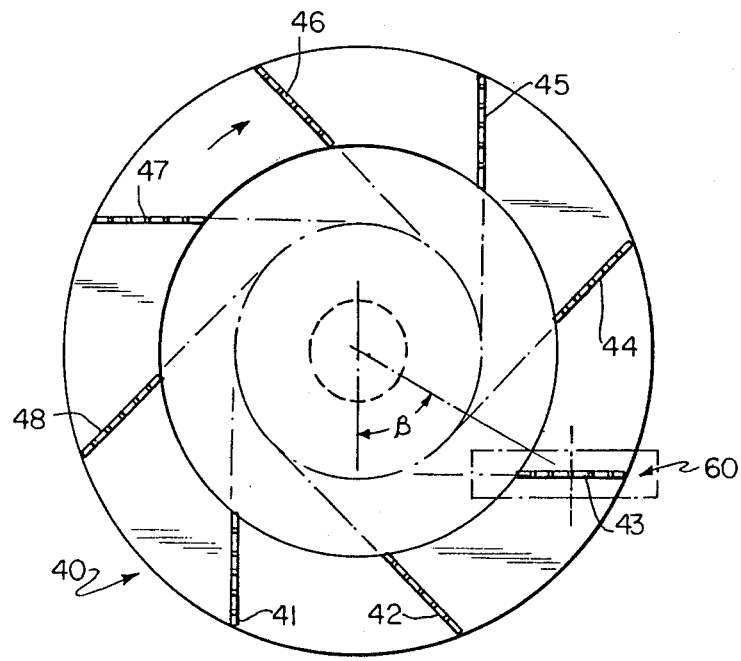
FIG. 4 illustrates a plan view of a cutter used in the manufacturing process of the bevolute gears.
Figure 5:
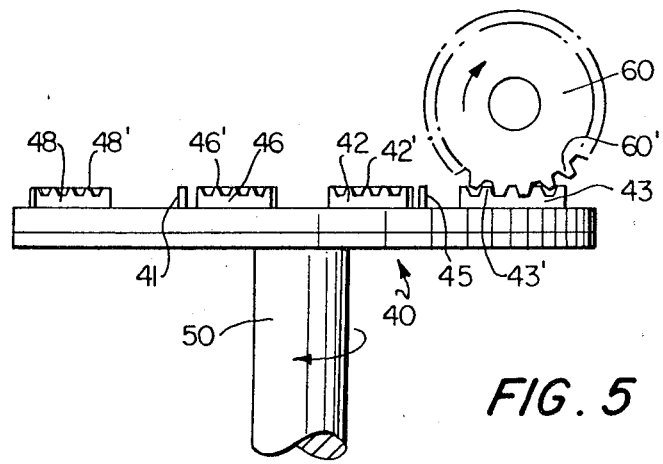
FIG. 5 is a side view of the cutter as shown in FIG. 4.
Figure 6:
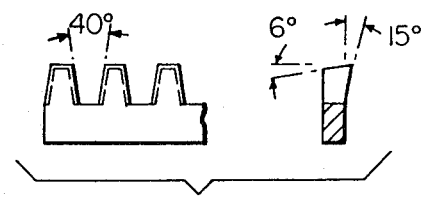
FIG. 6 illustrates a side and cross-sectional view of the involute rack profile cutter.

FIGS. 4 through 6 illustrate the machining of a pinion gear. The pinion cutter 40 includes a plurality of rack inserts 41 through 48. The eight (8) rack inserts shown in FIGS. 4 and 5 are tangent to the base-circle of the bevolute wheel gear which will be used in combination with the generated pinion gear. Note that this pinion cutter may also be made in one piece by gashing and relieving a hardened wheel gear.

The bevolute angle $\beta$, as shown in FIG. 4, is the angle at the center of the pinion cutter which is defined between the centerline of the offset pinion gear-blank which is tangential to the base-circle of the bevolute wheel gear.

As illustrated in FIG. 5, the eight (8) rack inserts 41 through 48 include cutting teeth 41' through 48', respectively. These cutting teeth generate the pinion teeth 60' which are shaped in the form of an involute spiral. The pinion cutter 40 is mounted for rotation on a shaft 50. The rack cutters must be set at progressive positions along the tangent to ensure total machining of the pinion gear-blank. In addition, the pinion gear-blank and the pinion cutter must be rotated in the direction shown in FIGS. 4 and 5 and with the proper ratio to ensure total machining of the pinion.

FIG. 6 illustrates a rack cutter wherein the angle between the cutting teeth is 40°. Although FIG. 6 illustrates a typical rack cutter for a 20° pressure angle system, the present invention is not limited to this system and may utilize rack cutters which are designed for other pressure angle systems such as a $14\frac{1}{2}°$ pressure angle system. The cross-sectional view of the involute rack profile cutter illustrates the shape of an individual cutting tooth.

ADVANTAGES OVER HYPOID GEARING SYSTEMS

It is readily apparent from the above discussion that the present invention reduces thrust loads to negligible values on both the bearings of the pinion gear and the wheel gear. This reduction in thrust loads is due to the fact that the bevolute gearing system is not conical, as in the bevel and hypoid gearing systems, but rather includes a pinion which is flat and in one plane like a plain spur gear. Therefore, the separating force due to the pressure angle of the involute system is the only thrust force on the gearing shaft and the frictional force of the gear mesh produces the only thrust force on the pinion shaft. Both of these forces are quite small in comparison with the forces produced in the bevel and hypoid gearing systems.

The present invention provides a higher mechanical efficiency at the same pinion gear offset. A theoretical analysis of the efficiency based on a predicted coefficient of friction indicates that a comparable hypoid gear with the same offset as the pinion gear of the present invention has a lower efficiency.

Further, the present invention discloses a bevolute gearing system with wider tolerance on the alignment of the gears. The exact adherence to centerline positioning is not necessary in the bevolute gearing system of the present invention. Movement along the axis of the wheel gear is permissible with constant angular velocity transmission due to the characteristics of the involute pinion and the rack form of the wheel gear. In addition, movement of the pinion gear along the plane 2—2 is unrestricted as long as the teeth of the pinion gear remain in contact with the teeth of the wheel gear. Lateral movement along the axis of the pinion gear is somewhat limited but within the range of liberal tolerances. Small angular misalignments of the pinion gear and the wheel gear are possible.

The present invention provides an interchangeability between the wheel gear and the pinion gear to produce different ratios using the same wheel gear. Once the pitch point has been established, it is obvious that a larger or smaller pinion gear will mesh equally as well with the wheel gear as the given pinion gear of the set. However, each pinion gear will have to be manufactured with a cutter corresponding to the given wheel gear.

An important aspect of the present invention is the simplicity of manufacturing both the wheel gear and the pinion gear. The involute curve has an advantage of exact generation from a straight line. This method is incorporated in all modern gear generating equipment and will be utilized in the present invention. The generation of the pinion gear and the wheel gear may be easily accomplished.

The teeth of the wheel gear and the pinion gear are shaped in the form of an involute spiral. Therefore, a sliding motion is obtained at the mesh between the pinion gear and the wheel gear. This sliding motion is similar to the meshing achieved with helical and hypoid gearing systems. The sliding motion of the pinion gear and the wheel gear of the present invention results in a progressive meshing of the gear teeth which eliminates much of the gear noise.

A wide range of ratios may be achieved with a given pinion gear and wheel gear of the present invention. For a given bevolute angle $\beta$ the ratio depends only on the number of teeth of the pinion gear and the wheel gear. There is no theoretical limitation. However, there will be a practical ratio for each bevolute angle $\beta$ depending on the design of the bevolute gearing system.

The present invention provides a bevolute gearing system which may be driven in either direction. Under most ratios and conditions the present invention will be non-self-locking. However, it may be possible that a large or small ratio between the pinion gear and the wheel gear will produce a self-locking condition. This condition depends on the bevolute angle $\beta$ and the coefficient of friction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. The method of generating a bevolute pinion gear adapted to mesh with a bevolute wheel gear, said bevolute wheel gear including teeth shaped in the form of an involute spiral generated from a base circle comprising:
   positioning a pinion cutter adjacent a pinion gear-blank, said pinion cutter including a plurality of rack shaped cutters being tangential to a base circle which corresponds to the base circle of said bevolute wheel gear;
   rotating said pinion cutter adjacent to said pinion gear-blank;
   rotatably feeding said pinion gear-blank relative to and concurrently with said rotating pinion cutter; and
   cutting said pinion gear-blank to include teeth which are shaped in the form of an involute spiral which mesh with said bevolute wheel gear having a corresponding base circle.

2. A method of generating a bevolute pinion gear according to claim 1, wherein said pinion cutter includes eight rack shaped cutters spaced around the circumference of said pinion cutter.

3. A method of generating a bevolute pinion gear according to claim 1, wherein said teeth of said pinion gear-blank are external involute teeth being positioned on the outer peripheral surface of said pinion gear.

4. A method of generating a bevolute pinion gear according to claim 1, wherein the axis of the pinion gear being offset from the axis of the pinion cutter and the centerline of the pinion gear being tangential to said base circle which corresponds to the base circle of said bevolute wheel gear, whereby the offset positioning of the pinion gear forms a bevolute angle at the center of said base circle between a line passing from the center of said wheel gear to the center of said pinion gear and a line passing from the center of said wheel gear normal to the centerline of said pinion gear to said base circle.

5. A method of generating a bevolute pinion gear according to claim 1, wherein said involute spiral teeth of said wheel gear being generated by a rack unwrapping from a base circle.

6. A method of generating a bevolute pinion gear according to claim 1, wherein an offset between the axis of said pinion gear and the axis of said pinion cutter being in the range of 50% to 75% of the pitch circle radius of said pinion cutter.

* * * * *